United States Patent

Ashkin et al.

[11] 4,092,535
[45] May 30, 1978

[54] DAMPING OF OPTICALLY LEVITATED PARTICLES BY FEEDBACK AND BEAM SHAPING

[75] Inventors: Arthur Ashkin, Rumson; Joseph Martin Dziedzic, Clark, both of N.J.

[73] Assignee: Bell Telephone Laboratories, Incorporated, Murray Hill, N.J.

[21] Appl. No.: 789,847

[22] Filed: Apr. 22, 1977

[51] Int. Cl.² ........................................... G01N 21/78
[52] U.S. Cl. ..................... 250/251; 250/312; 250/491; 250/492 R
[58] Field of Search ............... 250/251, 365, 372, 373, 250/312, 492 R, 491

[56] References Cited

U.S. PATENT DOCUMENTS

| | | | |
|---|---|---|---|
| 3,808,550 | 4/1974 | Ashkin | 250/251 |
| 3,955,089 | 5/1976 | McIntyre | 250/385 |
| 3,997,788 | 12/1976 | Boux | 250/385 |
| 4,023,158 | 5/1977 | Corcoran | 250/251 |

OTHER PUBLICATIONS

"Acceleration & Trapping of Particles by Radiation Pressure" by Ashkin, Physical Review Letters, vol. 24, No. 4, Jan. 26, 1970, pp. 156–158.

*Primary Examiner*—Harold A. Dixon
*Attorney, Agent, or Firm*—Daniel D. Dubosky

[57] ABSTRACT

An improvement on an optical levitation device is disclosed for damping perturbations of the position of a particle levitated in vacuum. It combines feedback control of the supporting laser beam with adjustment of the beam shape and size in order to damp perturbations in both the vertical and horizontal directions by means of the vertical feedback damping apparatus.

9 Claims, 5 Drawing Figures

DAMPING OF OPTICALLY LEVITATED PARTICLES BY FEEDBACK AND BEAM SHAPING

BACKGROUND OF THE INVENTION

Optical levitation is a technique for supporting transparent particles by the forces of radiation pressure from laser beams ("The Pressure of Laser Light", by A. Ashkin, *Scientific American*, 226, 63 (1972)). When optical levitation is done in air, the damping forces provided by the viscosity of the air control perturbations and hold the particles steady. When particles are suspended in high vacuum, the viscosity becomes negligible, and fluctuations in beam power, vibrations of the apparatus, etc. will introduce perturbations in the particle position that will die out only after a long time. This effect is discussed in a paper by the present inventors ("Optical Levitation in High Vacuum", A. Ashkin and J. M. Dziedzic, *Applied Physics Letters*, 28, 6, Mar. 15, 1976, pp. 333–335), which discusses the decay time of perturbations as a function of residual pressure. It would clearly be highly desirable to provide some means of damping, so the particle returns quickly to its equilibrium position.

In a similar art, that of magnetic levitation of small steel spheres, perturbations are damped by use of an external damping mechanism, comprising an on-axis steel rod mounted in a pot of viscous fluid ("Magnetic Suspension for Small Rotors", by J. W. Beams, *Review of Scientific Instruments*, 21, No. 2, (1950), FIG. 1). This particular arrangement is obviously inapplicable to optical levitation, not only because it depends on magnetism, but also because the use of external elements requires that the particle suspended be large and the excursion from the stable position also be large in order to produce an appreciable effect on an external damping apparatus.

SUMMARY OF THE INVENTION

The invention is an improvement on an optical levitation device for the purpose of damping fluctuations in the position of a particle levitated in vacuum. The invention lies in the combination of error rate feedback means for controlling vertical deflections of the particle by adjustment of the levitating beam power according to the principles of error rate feedback and adjustment of the beam shape and size in relation to the particle size so that the coupling between the horizontal deflections of the particle and its vertical deflections is increased to a desired amount. As a result of this beam adjustment the vertical control means will seek to damp out these associated vertical deflections and, in so doing, will extract energy from the particle and therefore damp out the horizontal fluctuations as well.

DETAILED DESCRIPTION

Figure 1:
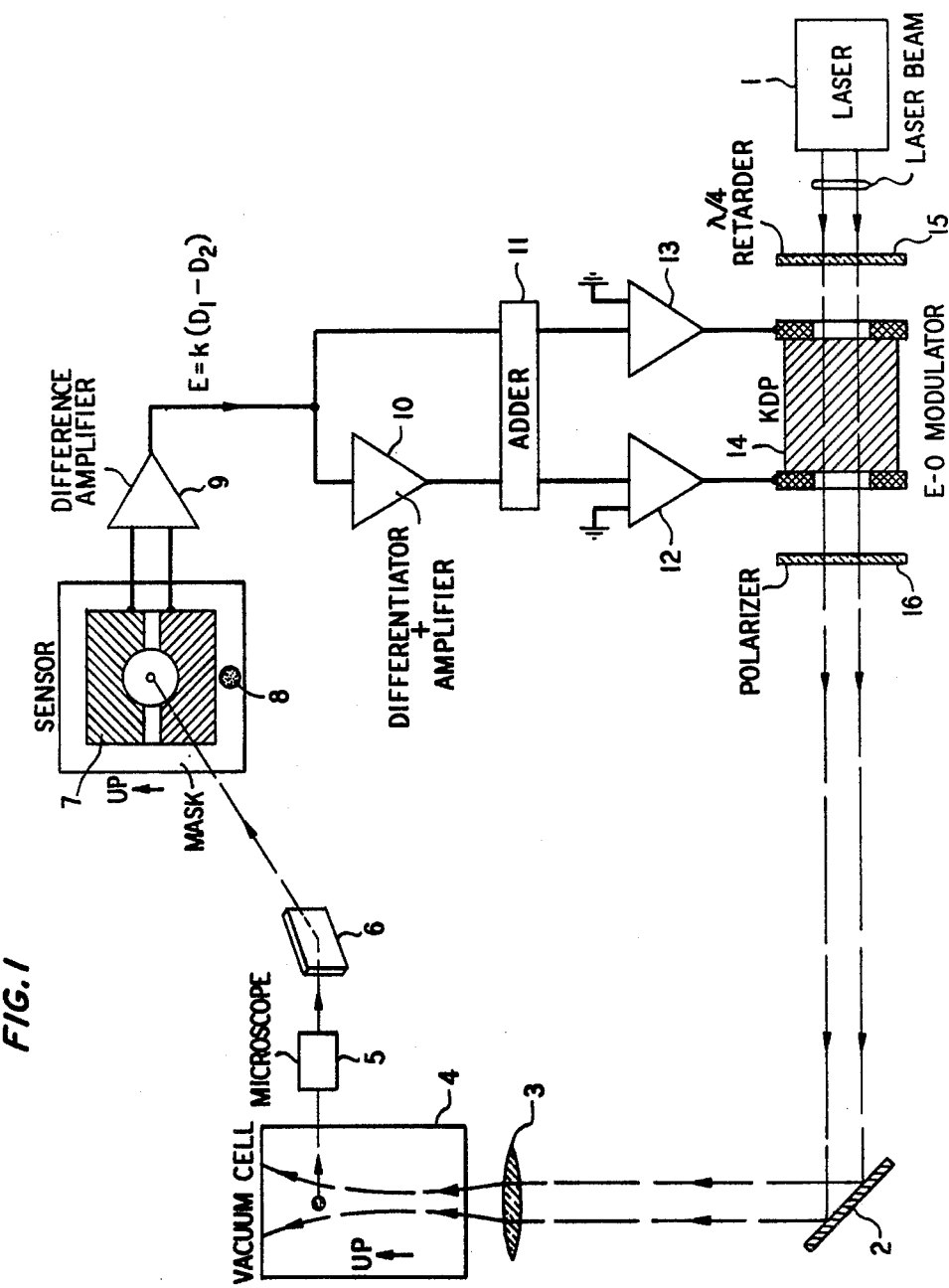
FIG. 1 is a partially schematic, partially pictorial diagram of an embodiment of the invention.

The invention has been reduced to practice in the apparatus shown in partially schematic, partially pictorial form in FIG. 1. Laser 1 produced a beam in the Gaussian mode, of diameter 1 millimeter, having a power of about 20 milliwatts. The beam was deflected upward by mirror 2, located beneath vacuum chamber 4. The beam was focused by lens 3, of focal length 2.3 centimeters, located between mirror 2 and vacuum chamber 4. In the particular embodiment described, the wavelength of the beam was 0.6 microns, the minimum spot size was 4.1 microns in diameter, and the particle had a diameter of 10.8 microns.

Vacuum chamber 4 had windows to permit the entrance of the supporting laser beam and the exit of the scattered light from the particle, which light was used for feedback control.

Light scattered from the particle in a horizontal direction was collected by microscope 5. The light emerging from microscope 5 was then reflected in a horizontal plane by mirror 6, thereafter striking detector 7. The magnification of the particle image at detector 7 was a factor of 280. Detector 7 was a split photodiode (United Detector Technology PIN Spot 2D Detector). The light scattered from the particle formed two spots, one from reflection off the bottom of the particle and one from refraction, either of which can be used. Mask 8 covered the outer portion of the detector and blocked the light from the reflected spot. The signals from detector 7 are proportional to the amount of light striking the upper and lower halves of the detector.

These two signals are processed by electronic means to give suitable feedback signals. The two signals enter a difference amplifier 9, the output of which is proportional to the difference between the two signals, amplified by a factor of approximately 1000. This difference signal is a measure of the deviation of the particle from its nominal position and can be used to control the beam in order to increase the restoring force on the particle that exists in the absence of feedback or to provide a restoring force in a case where the particle would be otherwise unstable, but it will not damp a perturbation of the particle's position. A damping signal was provided by differentiating the difference signal and amplifying it in differentiator and amplifier 10. The amplification was approximately a factor of 10. Both the difference signal and the derivative signal were combined in adder 11. The output of adder 11 was further amplified, with a gain of about 150, in amplifiers 12 and 13. The amplified signal was applied to electrooptic modulator 14, which was made of KDP (Potassium Dihydrogen Phosphate) and was approximately two inches long. Modulator 14, in connection with quarter-wave plate 15 and polarizer 16 produced a change in the laser beam power proportional to the voltage applied to crystal 14. The linearly polarized beam from laser 1 passed through quarter-wave plate 15 which circularly polarized it. The KDP crystal 14 changed the circularly polarized beam to elliptical polarization, the amount of ellipticity being dependent on the voltage applied to it. The power of the beam passing through polarizer 16 depended on the ellipticity of the beam and thus on the magnitude of the applied signal. In this manner, the beam power was increased or decreased to return the particle to its nominal position after it had been displaced vertically and to damp out vertical oscillations.

The feedback system described above acted directly to control perturbations of the particle position in the vertical direction. The same feedback system will also damp perturbations in the horizontal direction, as described below.

The distribution of intensity over the beam cross section is not uniform, and may be divided into two classes: the "Gaussian" mode, which has an intensity peak at the center and the "doughnut" mode, which has an intensity minimum at the center of a doughnut-shaped ring of high intensity. The former mode attracts solid transparent spheres toward the center, and the latter mode attracts reflecting spheres (and transparent spherical shells) toward the center. The mechanism by which horizontal restoring forces are exerted is the differential intensity across the particle.

For example, the force on a solid transparent particle is produced by the change in momentum of the photons as they are refracted by the sphere (in addition to surface reflections). The net result is that the force produced by the greater number of photons striking that part of a particle which is in a more intense region of the beam dominates, and the particle is pulled toward the region of maximum intensity. For a Gaussian mode, this is the beam center. The argument may easily be reversed to show that reflecting spheres are pushed away from regions of high intensity and may therefore be trapped in the center of a beam that has an axial intensity minimum. (See the *Scientific American* article cited hereinabove, p. 66 and "Stability of Optical Levitation by Radiation Pressure" by A. Ashkin and J. M. Dziedzic, *Applied Physics Letters*, 24, (1974), p. 586 for further background information.)

Figure 2:
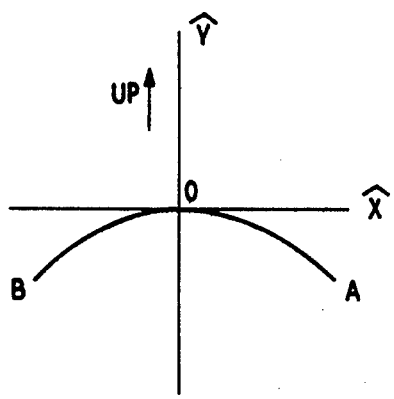
FIG. 2 is a diagram showing the path of a particle during horizontal oscillations.

The interrelation between the horizontal and vertical damping may be further explained with reference to the particular case of a solid transparent sphere in a Gaussian beam where the particle is located above the beam waist in a region of natural stability. FIG. 2 shows a graph of the motion for a horizontaly perturbed particle. Since the beam is radially symmetric, the motion is shown only in one plane. The desired point of rest is O, located on the beam axis. The vertical axis of the laser beam is $\hat{y}$, and $\hat{x}$ is a horizontal axis in the direction of the deflection.

Figure 3:
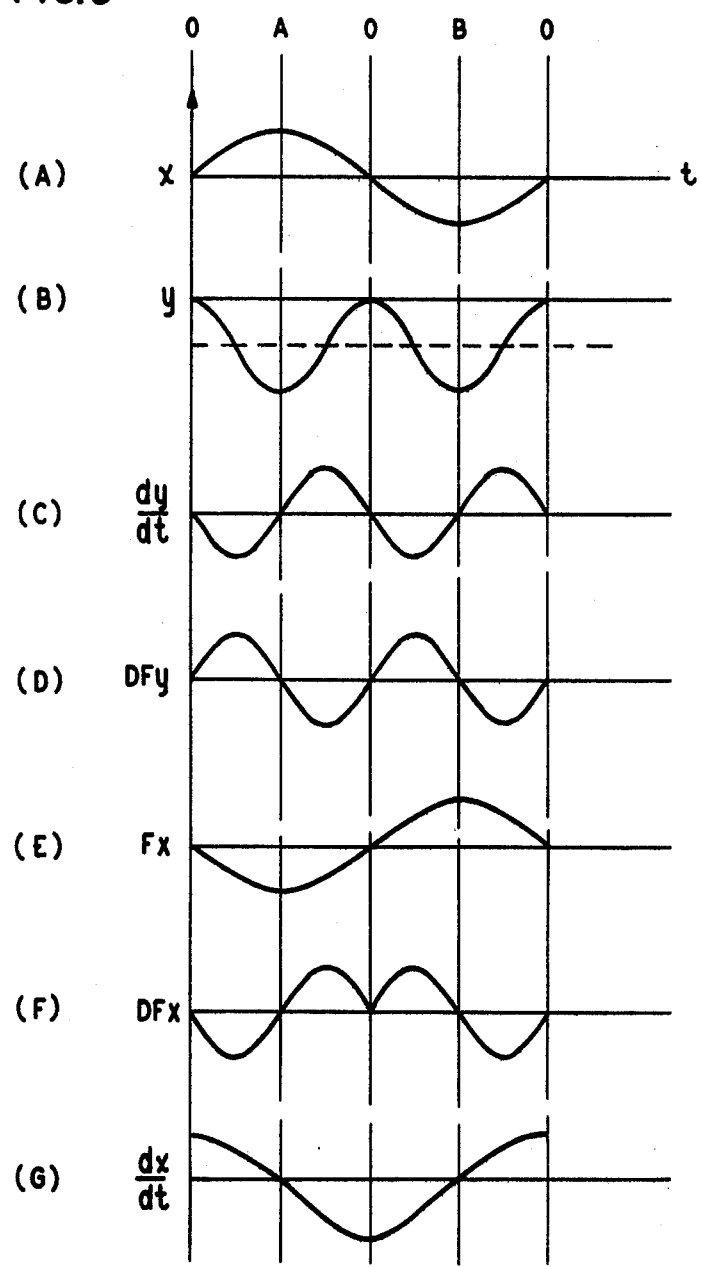
FIG. 3 shows waveforms illustrating various parameters of the particle's motion as it traces the path shown in FIG. 2.

When the particle is given a deflection in the horizontal direction, it moves outward along the $\hat{x}$ axis. Since the light intensity decreases as the particle goes away from the axis, the particle drops to a lower position as it goes out. The points of furthest excursion are referred to as A and B. The path of the particle during the course of a cycle is O to A, back to O, to B and back to O. FIG. 3 contains graphs displaying various parameters of the system as a function of time. The curves of FIG. 3 are arbitrarily drawn as sine and cosine functions, although a particular apparatus may respond according to a periodic curve of some different shape. The magnitudes of the graphs are arbitrary.

In waveform A of FIG. 3, a graph of radial position, $x$, versus time is displayed. The times when the particle is at O, A, and B are indicated. In waveform B of FIG. 3 a graph of vertical position, $y$, versus time is displayed, showing that the period for vertical motion is twice that for horizontal motion. In waveform C of FIG. 3, the derivative of $y$ with respect to time is displayed, showing the vertical velocity. Waveform D of FIG. 3 displays DF$y$, the additional vertical force produced by modulation of the supporting beam, which is adjusted to be the negative of the vertical velocity, since a damping force should oppose whatever velocity is present. Since the change in force is proportional to the change in beam power, the time dependence of waveform D also displays the time dependence of the additional beam power. For clarity of exposition, it is assumed that only the signal (from differentiator 10) proportional to the derivative of displacement (i.e., proportional to the vertical velocity) is used to modulate the beam. Waveform E of FIG. 3 shows the horizontal restoring force, F$x$, in the absence of damping. It is zero at the point O and is a maximum in opposite directions at points A and B. Waveform F of FIG. 3 shows the horizontal damping force (DF$x$) that results from the effect of the vertical damping force shown in waveform D of FIG. 3, i.e., the additional horizontal forces that is produced by a change in beam power in response to a change in vertical motion. The periods of the two forces are the same because DF$x$ is caused by DF$y$, of course, but it must be shown whether the horizontal force acts to damp or to accelerate the horizontal motion.

While the particle travels from O to A, the power in the beam is being increased as shown in waveform D. The radial gradient of the beam is thereby increased, since increasing beam power without changing the beam dimension will increase the gradient. Since the horizontal restoring force is caused by the radial gradient, the horizontal restoring force will also be greater in magnitude. (It is shown as negative over OA in both waveform E and F because it is directed back toward O.) Thus, while the particle travels outward from O to A, the horizontal damping force opposes its motion.

The horizontal damping force is zero at O, of course, as it must be if the particle is to remain at rest at O. It is also zero at points A and B because it is proportional to the vertical velocity, and which is zero at A and B. (The horizontal restoring force present without damping (waveform E) is a maximum at A and B, since it depends on the displacement from rest.)

On the return trip, from A to O, the vertical velocity is positive, so the vertical damping force is negative: i.e., the beam power is reduced. Since the beam power is reduced, the radial gradient is also reduced. During this period, the particle is returning to O, under the effect of the horizontal restoring force (waveform E of FIG. 3). Since the horizontal restoring force is produced by the radial gradient, the reduction in gradient reduces the horizontal restoring force. Over the path AO, the horizontal restoring force is negative (waveform E), so the additional force is shown in waveform F as positive.

We have seen that over the first half of the cycle (OAO), the additional horizontal force resulting from changes in the beam power acts to oppose the horizontal motion of the particle and therefore acts to damp that motion. In the third quarter of the cycle (OB), the particle is dropping, so the beam power is increased, resulting in a radial restoring force as described above for the path OA. Since the particle is in the negative $x$ region, a radial restoring force is now positive, as shown in the third quarter of waveform F. In the last quarter of the cycle, the particle is returning to O and DF$y$ is negative, so that the vertical velocity is opposed. Comparison of waveform G, which shows $dx/dt$ with waveform F showing DF$x$ makes explicit the fact that the effect of change in beam power on the horizontal restoring force is such as to oppose the horizontal velocity, i.e., that the condition for a horizontal damping force is met.

The explanation above deals with the case where a solid particle is in a naturally stable region of a diverging beam, so that a horizontal perturbation resulted in a lower vertical position of the particle. In the case of a solid particle of diameter larger than the beam waist, located near the beam waist, a horizontal perturbation would result in a higher vertical position. Similarly, a reflecting particle in a "doughnut mode" beam will rise when deflected horizontally. In both cases, the explanation given above carries over, with the obvious changes of sign.

In order to take advantage of this effect to produce a stably supported particle, some adjustment must be made to the beam shape and size as compared with the particles to be levitated. Vertical damping may be provided by control of the beam power as described above, but horizontal damping will still not necessarily result even when the particle is damped vertically. The reason is that horizontal damping is provided indirectly, in response to a change in vertical motion. If the intensity distribution is rather flat, so that the particle may move horizontally for substantial distance before its vertical change is detected by the monitoring device, the particle may oscillate freely within that distance without triggering the application of the horizontal damping force.

In order to provide effective horizontal damping, the apparatus must be modified so that horizontal and vertical deflections are coupled strongly. This structural change may be effected by a change in the laser beam size, by a change in lens 3 to give a smaller focus, or by altering the position of the focus relative to the nominal particle position. This position change may be accomplished by moving the position of lens 3, by moving the position of the photodetector, or by moving the position of the microscope.

When the apparatus described above was altered to increase the coupling between vertical and horizontal oscillations, the feedback mechanism operated to control the particle position within a fraction of a micron in both the horizontal and vertical directions.

Since the supporting beam may be smaller than the particle being levitated, it is possible to have a broad range of beam sizes, depending on other parameters. For example, if it is desired to confine the particle very tightly, a strongly converging beam is desired, and an appropriate means would be a lens to produce a sharp focus. In that case, the shape of the beam compared with the size of the particle would not be very important, as the sharp gradients produced by a sharp focus would confine and damp a particle for any reasonable values of the other parameters.

An application where tight confinement of the particle is required is that of holding targets for a laser fusion apparatus.

Another application of the invention is as a force meter. As the beam is focused less sharply that it is in the application above, the vertical restoring force in the vertical direction becomes greater, i.e., a greater change in beam power will be required to return the particle to its equilibrium position for a weakly focused beam than for a strongly focused beam. A change in focus to confine the particle less strongly in the vertical will also confine it less strongly in the horizontal, of course.

Since the amount of feedback required to maintain a particle at its equilibrium position is a measure of applied force, weak focusing can be used to measure mechanical forces (such as the flow of a gas), electrical forces, or even gravitational forces. For example, a particle levitated as described above at the focus of a beam having a 70 micron focal spot diameter moves 10 microns in height for a force change or gravity change of one part in one million of the particle's weight. Sensitivity of this order would be great enough to measure local variations in the earth's gravitational field.

Figure 4:
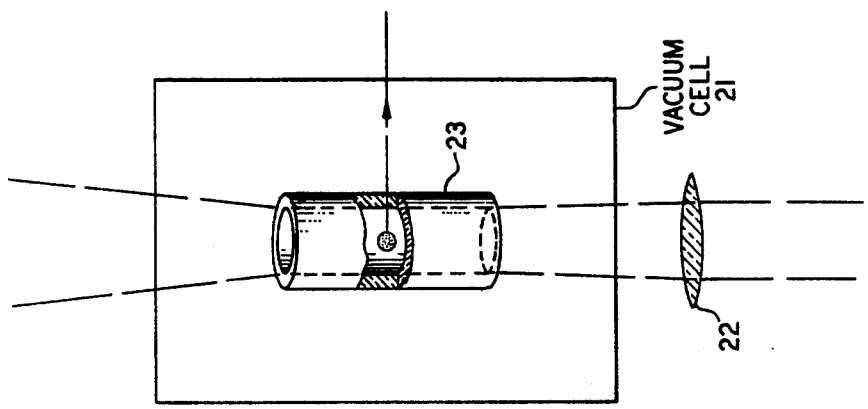
FIG. 4 shows a detail of an embodiment of the invention used as a force meter.

Another embodiment of the invention that is adapted to use as a force meter is illustrated in FIG. 4, which shows a modification of vacuum cell 4 of FIG. 1. Vacuum cell 21 contains waveguide 23 and conventional support structure not shown. Lens 22 focuses the beam into waveguide 23, which is of the Marcatili type. (Further information on the waveguide may be found in U.S. Pat. No. 3,368,043, issued on May 28, 1968 to E. A. J. Marcatili et al., which is incorporated herein by reference.) This type of waveguide is hollow, so that the particle may be levitated in its interior, and can be transparent to the levitating radiation so that the particle's position may be controlled by the apparatus illustrated in FIG. 1. The advantage of the waveguide is that the beam confined therein has essentially no divergence and only a small amount of loss, so that it is very nearly parallel. This near-parallelism provides extremely high sensitivity to applied forces through the feedback control explained above.

Another embodiment of the invention that employs the force meter configuration is the measurement of particle size to high accuracy. The Mie-Debye Theory (W. M. Irvine *Journal of the Optical Society of America*, 55, No. 16 (1965)) predicts the radiation pressure force on a sphere as a function of a size parameter $x = 2\pi a/\lambda$, where $a$ is the radius of the sphere and $\lambda$ is the wavelength of the levitating radiation. If the radiation pressure is calculated from the laser power required to support a sphere and the wavelength of the radiation is known, the radius may be calculated.

Figure 5:
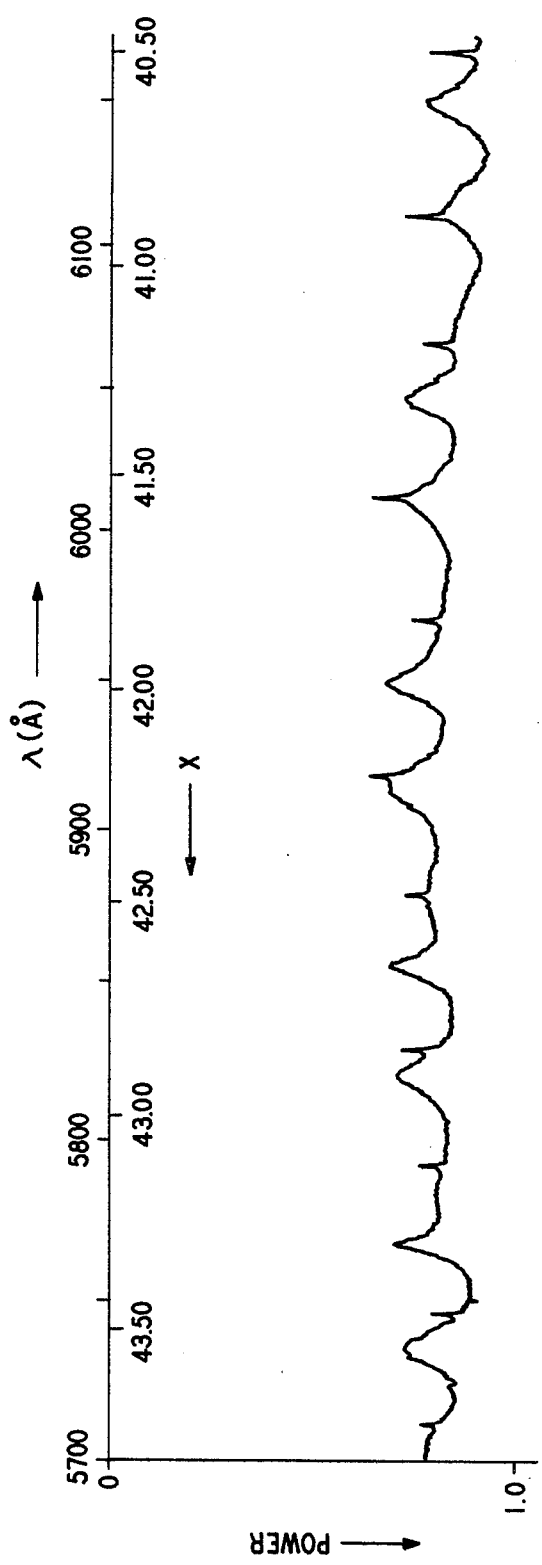
FIG. 5 shows a plot of supporting laser power versus wavelength for a particular particle.

In operation, a tunable laser is used for levitation, and the laser power is measured as a function of wavelength. The results of one such measurement for an approximately 8.0 micron diameter oil drop of index of refraction = 1.47 are displayed in FIG. 5, showing levitating power as a function of $\lambda$ and $x$. The positions of the peaks may be measured to an accuracy of about 1/20 Angstrom out of approximately 6000 Angstroms, so the precision of peak location, and hence of radius measurement is approximately one part in $10^5$.

In a further application determining size changes of a single particle (as for evaporation or condensation), the laser might be tuned to a point of steep slope on the side of a sharp resonance. In that case, changes of about 10 percent of the resonance height have been observed as a volatile drop evaporated. This corresponds to a change of 1/10 of the resonance width which gives a radius sensitivity of one part in $5 \times 10^5$. If $a = 5$ microns, a change of 0.1 Angstrom may be detected. For comparison, the standard method, based on the far field angular distribution of scattered light, gives a precision of only one part in $10^3$.

This technique may be used for the precise measurement of evaporation and condensation; for studying the deposition of monolayers; for the optical detection of drop oscillations and minute drop distortions; and for precise determination of the charge of an electron in a Millikan type experiment.

The applications of the invention that function as a force meter need not always require that the particle be in a vacuum. In general vacuum operation would be preferable because a sensitive system involves small forces and atmospheric damping would increase the response time of the device to an unacceptably large value. In some cases, it may be advisable to work in a partial vacuum in order to achieve a satisfactory balance among response time, sensitivity and damping.

What is claimed is:

1. An optical levitation device for supporting a particle comprising means for producing a substantially vertical supporting beam of coherent optical radiation having a radial intensity distribution, means responsive to the vertical position of said particle for controlling the power of said supporting beam in such a manner that said particle is supported at a desired position and so that perturbations of the vertical position of the particle are damped, and means for altering, by adjustment of said radial intensity distribution of said supporting beam, the amount of vertical perturbation in the position of the particle that results from a horizontal perturbation, whereby perturbations of the horizontal position of the particle are damped by controlling the power of said supporting beam.

2. An optical levitation device for supporting a particle comprising means for producing a substantially vertical supporting beam of coherent optical radiation having a radial intensity distribution, means responsive to the vertical position of a particle being levitated for controlling the power of said supporting beam in such a manner that said particle is supported at a desired position and so that perturbations of the vertical position of the particle are damped, in which optical levitation device said radial intensity distribution of said supporting beam is adjusted in such a manner that a horizontal perturbation of the position of the particle being levitated produces a corresponding vertical perturbation, of predetermined magnitude, whereby perturbations of the horizontal position of the particle are damped by said means for controlling the power of said supporting beam.

3. An optical levitation device according to claim 2 in which said means for producing a substantially vertical supporting beam includes a lens, the position of which may be varied so as to adjust the radial intensity distribution in the vicinity of said particle being levitated and thereby adjusting the magnitude of said corresponding vertical perturbation.

4. An optical levitation device according to claim 2 in which said means for producing a substantially vertical supporting beam includes a lens, the focal length of which is selected to be a predetermined value such that said radial intensity distribution is adjusted in such a manner that said corresponding vertical perturbation of predetermined magnitude is produced.

5. An optical levitation device according to claim 2 in which said means for producing a substantially vertical supporting beam includes a laser, which laser is adjusted to operate in a predetermined manner, such that said radial intensity distribution is produced in such a manner that said corresponding vertical perturbation of predetermined magnitude is produced.

6. An optical levitation device according to claim 2 in which said means for producing a substantially vertical supporting beam includes means for adjusting the diameter of said supporting beam, which means is adjusted so that said radial intensity distribution is produced.

7. A force meter comprising means for optically levitating a particle, including at least one laser beam, and means responsive to the position of the particle being levitated for controlling the power of said laser beams in such a manner that said particle is supported at a desired position, whereby a change of power of said laser beams in response to an external force applied to said particle provides a measure of the magnitude of said external force.

8. A force meter according to claim 7 in which said means for levitating a particle includes a dielectric waveguide, within which said particle is levitated by said laser beam.

9. A device for the measurement of particle diameter comprising:

means for levitating a particle, including at least one tunable laser, means responsive to the position of the particle being levitated for controlling the power of said laser in such a manner that said particle is supported at a desired position, means for varying the frequency of said tunable laser, and means for measuring the power of said laser as the frequency is tuned, whereby the relationship between said power and said frequency provides a measure of the diameter of the particle being levitated.

* * * * *